Patented July 7, 1953

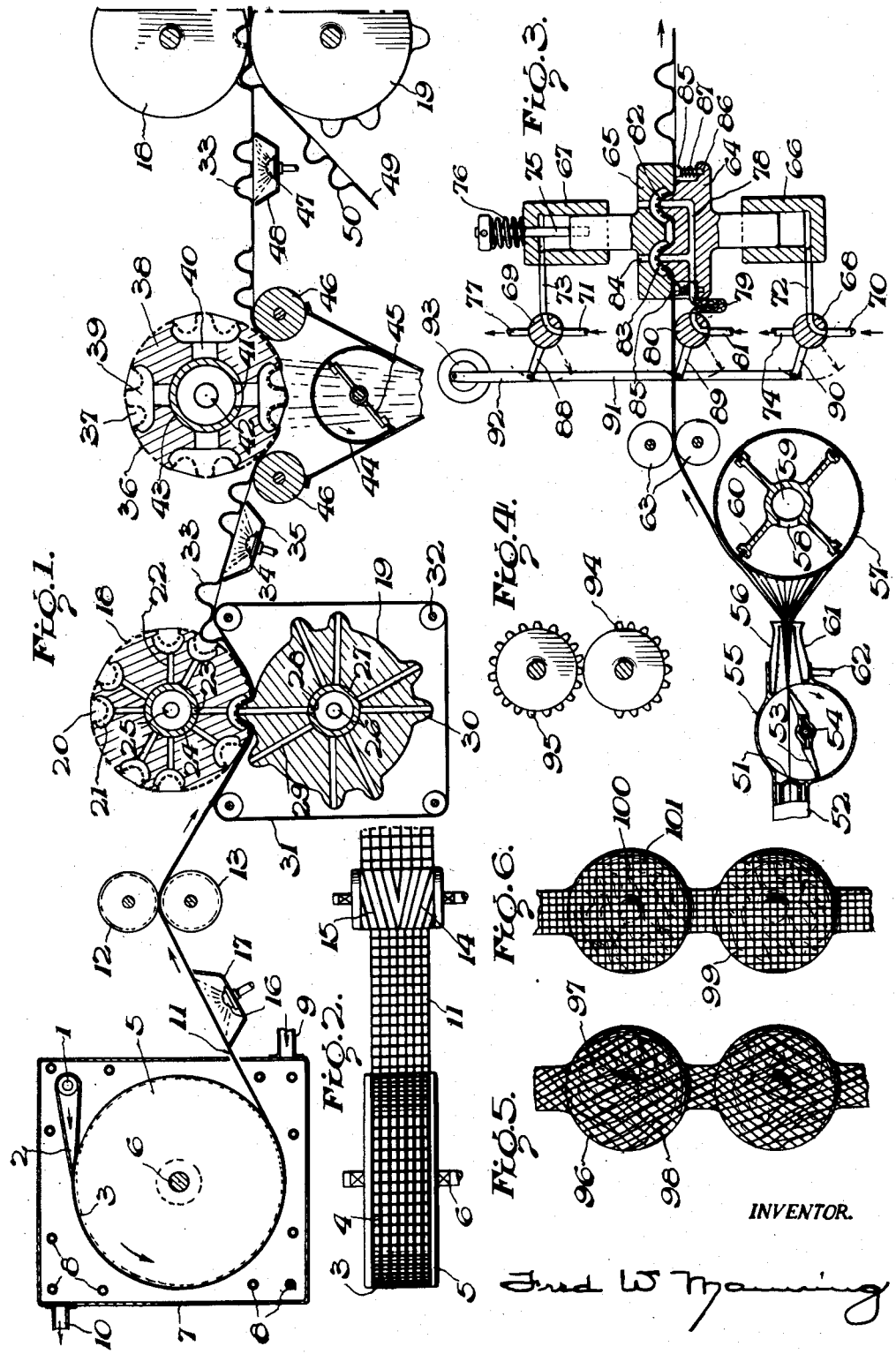

2,644,779

UNITED STATES PATENT OFFICE 2,644,779

METHOD FOR THE CONTINUOUS MOLDING OF BRASSIÈRES AND OTHER THREE-DIMENSIONAL ARTICLES

Fred W. Manning, Palo Alto, Calif.

Application February 3, 1948, Serial No. 6,064

12 Claims. (Cl. 154—90)

My invention relates to the molding of three-dimensional articles—flexible articles such as brassières, corsets, corselets, girdles, helmets, shoulder pads, bags for packaging, etc.; and rigid articles, such as canoes, coffins, cabinets, refrigerators, the bodies of motor vehicles, etc. This application is a continuation-in-part of my copending application, Serial No. 488,318, filed May 22, 1943, now abandoned.

Prior practice has been to manufacture such articles as women's foundation garments from a comparatively great many pieces. The sewing together of these pieces resulted in seams and ridges which chafed the wearer and did not appeal to the observer. Furthermore, knitted or woven yarns had a tendency to slip over one another to equalize the strain thereby resulting in loss of shape, which was accentuated in the washing of the article.

It is therefore an object of my invention to mold all such articles in one piece from integral non-woven fabrics of man-made threads of any predetermined size and shape, which fabrics can then be reinforced by laminations with other similar fabrics. Wearing apparel can thereby be made attractive, worn in comfort, and will have the rigidity, flexibility, extensibility and permanence that cannot be obtained from articles made from many pieces of woven and knitted goods reinforced by bone and wire supports.

The materials used in the formation of my non-woven fabrics may be the thermoplastic materials usually spun into filaments, films and foils. Some of the most common of these are: polymeric amides, vinylidene chloride, glass, quartz, etc., usually spun from a molten state; cellulose acetate, vinyl chloride-acetate resins, etc., usually spun from solutions. Thermosetting materials, such as melamine resins, may also be used for the integral fabrics required for the more rigid molded articles; an integral fabric made from thermoplastic threads may be impregnated and made impervious by a thermosetting resin; an integral fabric made from thermosetting threads may be impregnated and made impervious by a thermoplastic resin; or a homogeneous impervious fabric may be produced by using the same materials for the impregnant that are used to form the fabric.

The stretching characteristics of the filaments or threads vary with the materials and how they are used. The molecular orientation of a polyamide filament will begin as soon as the stretching reaches a point where the filament assumes a substantially straight line between horizontal holding and pulling means without the aid of support between the two said means. Its setting may be accomplished by subjecting it to any temperature below its softening point, the latter being defined as that temperature at which a stretch-oriented filament begins to lose its stretch-orientation. It may then be cold-drawn in a solid state under tension to five, six or even seven times its length until it reaches its initial point of elasticity, and between this point and its elastic limit it will be truly elastic, returning to its initial point of elasticity whenever the pulling force has been removed. Other filaments or threads may be stretch-oriented in a plastic condition, but cannot be cold-drawn; still other materials from which filaments and threads can be made on a casting drum cannot be stretched in any condition. All these characteristics are utilized in my various molded products.

In accordance with certain aspects of my invention the spinning material, or material from which an integral fabric can be made, is discharged from a feed manifold into circumferential and longitudinal grooves on a casting drum, the lips of the manifold having a length equal to the width of the drum and being adjusted to close contact with the surface of the drum in a manner well known to those familiar with the production of films. These grooves may be designed to produce filaments or threads of very high denier, as for instance 2500, or even much higher; and they may be made of any desired shape. As the grooves will intersect, and may intersect at any desired angle, an integral fabric will be formed of threads running lengthwise of the fabric and referred to hereinafter as primary filaments or threads, and of threads running crosswise of the fabric and referred to hereinafter as secondary filaments or threads.

The thread producing material may be discharged under pressure into the grooves in a liquid or plastic condition. Cooling of molten or plastic threads, or evaporation of solvent from threads deposited from a solution, will make it possible for the integral fabric to be lifted from the drum in a plastic or set condition. The fabric may then be stretch-oriented while the threads are still in a plastic condition, or cold-drawn after the threads have become set; and a positive pull may be exerted simultaneously on both primary and secondary threads by means of gripping rolls having left and right hand spreading screws starting from the center of the rolls.

The fabric should be partly cold-drawn by the pulling rolls so that the final cold-drawing to the initial point of elasticity may be accomplished as a part of the molding operation. The shape of the article to be molded may be such that the male and female molds will move in rolling contact in involute curves upon one another; or the shape to be molded may be such that the molds will move in sliding contact with one another; or the shape may be such that the molds must be pivoted within their rotors for a continuous movement to be produced; or the articles to be molded may be of such shape and size that reciprocating molds of intermittent movements must be used. The frictional contact between the fabric to be molded and the rotor carrying the female molds will usually be sufficient to make unnecessary the clamping of a light weight fabric at the entrance to the female mold, but when necessary a non-extensible, endless, friction belt with suitable openings for the male molds, may be used to hold the fabric firmly against the female rotor during the molding operation.

The molded fabric may be passed through a fibre depositing apparatus where the molded article, as well as the bands and straps attached thereto, may be given a coating of discrete fibres. These may be natural fibres, such as cotton, wool, hair, fur, ramie, cattail, milkweed, kapok, feathers, asbestos, shredded leather, etc., added for warmth, appearance, absorption, softness, to give rigidity to the molded article, and particularly limit the extensibility of integral fabrics which have been incompletely cold-drawn, or which cannot be cold-drawn. Fusible fibres, such as nylon, rayon, Vinyon, etc. may be deposited in mixture with or as a coating for the natural fibres, and used to bond the latter within the molded article or to attachments for the molded article.

The invention is exemplified in the following description, and a preferred arrangement for producing brassières is illustrated by way of example in the accompanying drawings, in which:

Fig. 1 is a diagrammatic sectional view of one form of apparatus for carrying out the present invention.

Fig. 2 is a plan view of the casting drum and fabric stretching rolls shown in Fig. 1.

Fig. 3 is a diagrammatic sectional view of a modified form of the apparatus shown in Fig. 1.

Fig. 4 is an elevation view of the driving gear arrangement for the molds shown in Fig. 3.

Fig. 5 is a front view of one type of brassière with the side straps broken away.

Fig. 6 is a front view of another type of brassière with the side straps broken away.

Referring to the drawings more specifically by reference characters: Fig. 1 shows an arrangement in which molten fluid from the feed pipe 1 is discharged under pressure through an extrusion outlet 2 into the circumferential grooves 3 and intersecting longitudinal grooves 4 of the drum 5, which is rotated by a drive shaft 6 within a chamber 7. The latter is heated by coils 8, but additional temperature control may be obtained from the ventilating fluid which enters at 9 and escapes at 10. The integral fabric 11 thus formed may be removed from the drum by positive pull of top and bottom gripping rolls 12 and 13, respectively, whose peripheral speed being greater than that of the drum will cause the primary (lengthwise) filaments to be partly cold-drawn or otherwise stretch-oriented. The left and right hand spreading threads 14 and 15, respectively, of the two rolls will simultaneously cause the secondary (crosswise) filaments to be partly cold-drawn or otherwise stretch-oriented. If the fabric is still in a plastic condition at the time it leaves the casting chamber, it may be quenched by a water or steam bath from the spray nozzle 16 enclosed within the casing 17.

The integral fabric of primary and secondary filaments, both of which have been partly cold-drawn, can now be drawn between the top and bottom mold rotors 18 and 19, respectively. The former conveys the female molds 20 situated above the drainage cups 21 which are connected during the molding operations by passages 22 to the opening 23 in the hollow stationary axis 24, the latter having an exhaust outlet 25. In somewhat like manner, the treating fluid inlet 26 in the hollow stationary axis 27 is connected by opening 28 with the passages 29 to the male molds 30 during engagement of the male and female molds. The frictional contact arc between the fabric and female rotor will usually be sufficient to hold the fabric in position during the molding operations, but when necessary a non-stretchable endless belt 31, passing over the rolls 32 and having openings for the male molds, may be used to increase greatly this frictional contact.

The molded fabric may be treated with a solvent or non-solvent adhesive for bonding fibres to be deposited in the breast-cups 33. This treatment will ordinarily not be required, but may be obtained by a spray contact from nozzle 34, which is enclosed within a casing 35. The fibre depositing apparatus consists of a foraminous rotating drum 36 equipped with female molds 37 to engage with the said breast-cups. Enclosed within and rotating with the drum is a cylinder 38 equipped with drainage cups 39, each pair of which connects by a passage 40 with the opening and outlets 41 and 42, respectively, in the stationary axis 43 at the time that the breast-cups engage with their respective female molds. The fibres are produced by a fibre mill not shown, and under a differential air pressure conveys the fibres through the screen 44 for deposition in the breast cups. The screen gives a uniform distribution and is maintained in an open condition by a rotating brush 45, the rollers 46 preventing escape of the conveying fluid except through the passage indicated.

The breast cups after being padded with soft resilient fibres to a sufficient depth, may be treated for lamination purposes by a solvent or other adhesive from a spray-nozzle 47 enclosed within a casing 48. A similar molded fabric 4 equipped with breast cups 50 can be conveyed on the underside of the molded fabric just described, and the two meshed and laminated together by being run between rotating male and female molds similar to those indicated above. The straps connecting each pair of breast cups can now be severed, and the latter trimmed and attached to other portions of foundation garments made and molded in similar manner.

Fig. 3 shows an arrangement in which fibres are stretch-oriented, deposited by a blast of elastic fluid to form an integral fabric of promiscuously intersecting filaments, and the fabric molded by passage between reciprocating molds in an intermittent movement, the fibre depositing apparatus and pulling or laminating rolls being the same as those described above. The fabric forming apparatus is described in my Patent No. 2,437,264. As indicated, the spinning material is extruded in filaments at 51 from the heated container 52, the filaments positively pulled a predetermined amount by the rotating vanes 53 which are actuated by force of a fluid stream entering the fixed shaft 54. The force of the stream also conveys the stretch-oriented filaments from the chamber 55 through the barrel 56 and deposits them on the rotating foraminous wall 57 in a promiscuously intersecting condition by passage of the conveying fluid through the wall, opening 58, and pipe axis 59, the arms 60 preventing any suction being maintained within the wall except below the depositing surface. Ejector 61 supplied by an inlet pipe 62 is used to treat the filaments in various ways during deposition, as by solvents, adhesives, abrasives, carbon, diatomaceous earth, fibres, etc.

The integral fabric of promiscuously intersecting filaments is guided and pulled by rolls 63 and the fibre depositing apparatus, respectively, between the reciprocating male and female molds 64 and 65, respectively, operating in cylinders 66 and 67, respectively, and are controlled by rotating air valves 68 and 69, respectively, having inlets 70 and 71, respectively, and cylinder connecting pipes 72 and 73, respectively. Both molds retract when air pressure is cut off, the male molds by virtue of its weight the exhaust escaping at 74, and the female mold because of its bolt and retraction spring connections 75 and 76, respectively, its exhaust escaping at 77. Treating fluids such as hot air, steam, solvent vapor, adhesives, etc., are supplied to the male molds through passages 78, flexible hose 79, rotating valve 80, and inlet 81. The female molds are equipped with finely perforated plates 82, drainage chambers 83, and outlet passages 84. Pressure ring 85 connected by studs 86 and springs 87 to the male mold, holds the fabric firmly against the female mold at the time the molds are coming together. The operating valves are connected by link mechanism, 88, 89, 90, 91, and 92 to a driving eccentric 93, and both the eccentric and pulling drums for the fabric are synchronized and the time movement controlled by means of an interrupted timing driving gear 94 meshing with the driven gear 95 shown in Fig. 4.

Fig. 5 shows a brassière 96 with its side straps broken, and in which the integral fabric of promiscuously deposited filaments 97 are coated with natural fibres 98.

Fig. 6 shows a brassière 99 with its side straps broken, and in which the integral fabric of uniformly spaced filaments 100 are coated with natural fibres 101.

The following specific example is given for the purpose of illustrating, but not limiting, the invention.

In the production of brassières, a synthetic linear polyamide is discharged in fibre-forming fluidity from the feed manifold 1 through an extrusion 2 into the intersecting grooves on the casting drum to form primary and secondary filaments of the integral fabric 11. Cooling of the plastic fluid below its softening point results in the filaments setting sufficiently to be lifted from the drum as an integral fabric, after which the latter is quenched by a water spray from the nozzle 16. The stretching rolls 12 and 13 rotate at a speed adequate to cold-draw both primary and secondary filaments sufficiently so that after the fabric has been distorted between the primary molding rolls to form breast cups the filaments have been cold-drawn to the initial point of their elasticity, during which time they are subjected to saturated steam passing through them for the purpose of increasing the permanence of the molding. On leaving the primary molding rolls the fabric is sprayed with a suitable non-solvent adhesive from a nozzle 34 to bond the discrete fibres from the fibre apparatus deposited for stiffening purposes upon the fabric and within the breast cups by a fibre conveying fluid passing therethrough. The fibre coated and molded fabric is then sprayed with a resin adhesive from nozzle 47 and laminated to a similar, secondary fabric with the said fibres therebetween by passing the two fabrics between a secondary pair of molding rolls while subjecting both fabrics to pressure of the rolls and heat of a contacting fluid from inlet 26 to cure the said resin bond.

It will be obvious from the foregoing description that a great many treating fluids may be used in the above described molding operations for many different purposes: A non-solvent swelling agent such as saturated steam may be passed through the molds during the molding operation to facilitate the cold-drawing and permanently set a molded article formed from synthetic linear polyamide filaments; an acetone solvent may be passed through the molds to bond cotton fibres within a cellulose acetate molded article; the molds may be heated externally, or by passage therethrough of steam or heated air, and the heat with pressure exerted by the molds may be used to bond a coating or filling of natural fibres by thermoplastic fibres; or heat supplied, as above indicated, with or without pressure may be used to cure a thermosetting molded article.

It will also be evident that a plurality of integral fabrics, before or after molding and before or after receiving a coating of discrete fibres or other solids, may be laminated together under heat and pressure with or without the aid of solvents or non-solvents adhesives; and that after the necessary integral fabrics have been formed the molding, fibre depositing, and laminating operations may be carried out in any desired sequence.

It will still furthermore be evident that contact between the treating agent and the molded article by passage of the former through the perforated female mold from its drainage chamber will ordinarily be sufficient, but that when necessary the male mold may be capped with a drainage chamber covered by a finely perforated plate similar to those of the female mold, in order that a more uniform passage of the treating agent through the molded article may be accomplished.

I claim as my invention:

1. In a method for molding articles from a fibre-forming material, the steps comprising: depositing the said material in intersecting filaments to form an integral web in which the filaments are bonded to one another by their own adhesiveness; uniformly and progressively stretching successive portions of the said web to stretch-orient the said filaments; and progressively distorting successive, uniformly spaced portions of the said web to the initial point of elasticity of the said filaments to produce a series of three-dimensional shapes, the said operations being accomplished during a continuous movement of the said web.

2. In a method for molding articles from a fibre-forming material, the steps comprising: depositing the said material in intersecting filaments to form an integral web in which the filaments are bonded to one another by their own adhesiveness; uniformly and progressively stretching successive portions of the said web to stretch-orient the said filaments; progressively distorting successive, uniformly spaced portions of the said web to the initial point of elasticity of the said filaments to produce a series of three-dimensional shapes; and imparting a permanent set to the said shapes while they are subject to the said distorting force, the said operations being accomplished during a continuous movement of the said web.

3. In a method for molding articles from a fibre-forming material, the steps comprising: depositing the said material in intersecting filaments to form an integral web in which the filaments are bonded to one another by their own adhesiveness; uniformly and progressively stretching successive portions of the said web to stretch-orient the said filaments; and progressively distorting successive portions of the said web at uniformly spaced intervals to produce a series of three-dimensional shapes, the said operations being accomplished during a continuous movement of the said web.

4. In a method of molding articles from a fibre-forming material, the steps comprising: depositing the said material in intersecting filaments to form an integral web in which the filaments are bonded to one another by their own adhesiveness; and progressively distorting successive, uniformly spaced portions of the said web to produce a series of three-dimensional shapes and stretch-orient the filaments of the shapes, the said operations being accomplished during a continuous movement of the said web.

5. In a method for molding articles from an integral web of intersecting and uniformly stretch-oriented filaments, a step comprising imparting a series of three-dimensional shapes to the said web, and simultaneously cold-drawing the said filaments of the said shapes to the initial point of elasticity of the filaments by progressively distorting successive portions of the web at uniformly spaced intervals a predetermined amount, the said operations being accomplished during a continuous movement of the web.

6. In a method of molding articles from a fibre-forming material, the steps comprising: depositing the said material in intersecting, thread-like and adhesive portions to form an integral web of filaments; uniformly and progressively stretching successive portions of the said web to stretch-orient the said filaments; and progressively distorting successive portions of the stretched web at uniformly spaced intervals to produce a series of three-dimensional shapes without loss to the filaments of their said stretch-orientation, the said operations being accomplished during a continuous movement of the said web.

7. In a method of molding articles from a fibre-forming material, the steps comprising: depositing the said material in intersecting, thread-like and adhesive portions to form an integral web of filaments; and progressively distorting successive portions of the said web at uniformly spaced intervals, and simultaneously cold-drawing the filaments of the said successive portions to the initial points of elasticity of the filaments to produce a series of three-dimensional shapes, the said operations being accomplished during a continuous movement of the said web.

8. A method of molding articles from a fibre-forming material comprising: depositing the said material in intersecting, thread-like and adhesive portions to form an integral web of primary and secondary filaments; uniformly and progressively stretching successive portions of the said web in longitudinal and lateral directions to stretch-orient the said primary and secondary filaments, respectively; and progressively distorting successive portions of the stretched web at uniformly spaced intervals to produce a series of three-dimensional shapes without loss to the said filaments of their said stretch-orientation, the said operations being accomplished during a continuous movement of the said web.

9. A method of molding articles from a fibre-forming material comprising: depositing the said material in intersecting, thread-like and adhesive portions to form an integral web of primary and secondary filaments; uniformly and progressively stretching successive portions of the said web in longitudinal and lateral directions to stretch-orient the said primary and secondary filaments, respectively; progressively distorting successive portions of the stretched web at uniformly spaced intervals to produce a series of three-dimensional shapes without loss to the said filaments of their said stretch-orientation; and imparting a permanent set to the said shapes while they are subject to the said distorting force, the said operations being accomplished during a continuous movement of the said web.

10. In a method of molding articles from a fibre-forming material, the steps comprising: depositing the said material in an intersecting, thread-like, and adhesive portions to form an integral web of filaments; progressively subjecting the said web to the rolling contact pressure of male and female molding surfaces to distort successive portions of the web at uniformly spaced intervals and produce a series of three-dimensional shapes; passing a fibre-conveying fluid through the said shapes to form a coating thereover; and bonding the said coating to the said shapes, the said operations being accomplished during a continuous movement of the said web.

11. In a method of molding articles from a fibre-forming material, the steps comprising: depositing the said material in an intersecting, thread-like, and adhesive portions to form an integral web of filaments; uniformly and progressively stretching successive portions of the said web to stretch-orient the said filaments; progressively subjecting the said web to the rolling contact pressure of male and female molding surfaces to distort successive portions of the web at uniformly spaced intervals and produce a series of three-dimensional shapes without loss to the said filaments of their said stretch-orientation; passing a fibre-conveying fluid through the said shapes to form a coating thereover; and bonding the said coating to the said shapes, the said operations being accomplished during a continuous movement of the said web.

12. In a method of molding articles from a fibre-forming material, the steps comprising: depositing the said material in an intersecting, thread-like, and adhesive portions to form primary and secondary integral webs of filaments; uniformly and progressively stretching successive portions of the said webs to stretch-orient the said filaments; passing a fibre-conveying fluid through one of the said webs of filaments to deposit a web of discrete fibres thereupon; bonding the said web of discrete fibres between the two said webs of filaments to form a laminated web; and progressively distorting successive portions of the said laminated web at uniformly spaced intervals to produce a series of three-dimensional shapes without loss to the said filaments of their said stretch-orientation, the said operations being accomplished during a continuous movement of the said web.

FRED W. MANNING.

References Cited in the file of this patent

UNITED STATES PATENTS

| Number | Name | Date |
|---|---|---|
| 934,214 | Ratignier | Sept. 14, 1909 |
| 1,462,858 | Hopkinson et al. | July 24, 1923 |
| 1,488,048 | Hopkinson | Mar. 25, 1924 |
| 1,600,412 | Hennessy | Sept. 21, 1926 |
| 1,660,924 | Hopkinson | Feb. 28, 1928 |
| 1,834,556 | Toles | Dec. 1, 1931 |
| 2,047,230 | Schneider | July 14, 1936 |
| 2,285,967 | Hardy | June 9, 1942 |
| 2,332,373 | Dorough et al. | Oct. 19, 1943 |
| 2,361,369 | Grebe et al. | Oct. 31, 1944 |
| 2,415,023 | Novotny | Jan. 28, 1947 |